United States Patent [19]

Enterria et al.

[11] Patent Number: 5,154,566
[45] Date of Patent: Oct. 13, 1992

[54] PERFECTED HYDRAULIC MACHINE PREFERABLY FOR MINIMUM HEIGHT WATERFALLS

[76] Inventors: Gonzalez J. J. Enterria; Durio E. Siloniz, both of Avenida de Moratalaz, 149, Madrid, Spain

[21] Appl. No.: 652,925
[22] Filed: Feb. 8, 1991
[51] Int. Cl.⁵ .................. F03B 13/12; F03B 15/06; F03D 7/00
[52] U.S. Cl. .................. 415/3.1; 415/7; 415/8; 415/906; 416/197 A
[58] Field of Search .............. 416/197 A; 415/7, 3.1, 415/906, 8

[56] References Cited

U.S. PATENT DOCUMENTS

| | | | |
|---|---|---|---|
| 1,082,883 | 12/1913 | Lefler | 415/7 |
| 4,076,447 | 2/1978 | Granata et al. | 415/8 |
| 4,204,795 | 5/1980 | Forrest | 416/197 A |

FOREIGN PATENT DOCUMENTS

| | | | |
|---|---|---|---|
| 0557416 | 8/1923 | France | 416/197 A |
| 0028878 | 2/1982 | Japan | 416/197 A |

*Primary Examiner*—Thomas E. Denion
*Attorney, Agent, or Firm*—Peter L. Michaelson

[57] ABSTRACT

This machine consists of an impeller formed by a right prism with a minimum weight/volume ratio and which has an irregular hexagonal section, three sides of which are bigger than the other three, and with said hexagon's vertexes belonging to a single circumference. The second body of said machine is formed by an open cylindrical chamber, concentric to the impeller, with an angle of approximately 83 degrees.

Its basic characteristic is its high performance in obtaining energy produced by minimum height waterfalls.

16 Claims, 1 Drawing Sheet

PERFECTED HYDRAULIC MACHINE PREFERABLY FOR MINIMUM HEIGHT WATERFALLS

TECHNICAL FIELD OF THE INVENTION

The present invention consists of a perfected hydraulic machine preferably used for minimum height waterfalls, which offers a series of very important advantages over the present hydraulic machines destined for similar jobs.

BACKGROUND ART

We wish to point out that in order for present hydraulic systems to transform and use hydraulic energy with an acceptable yield, they must use waterfall heights of over 2 meters, as under 2 meters the performance drops to levels that make the use of these bodies of water uneconomical.

The present hydraulic machines are generally classified as action and reaction turbines. Of the former, we find the so-called "PELTON" turbines with an ideal field of application between 20 and 300 meters high waterfalls.

In the second group, and in first place we find the so-called "FRANCIS" turbines with an application range of between 4 and 200 meters, while—in second place—we find those called "KAPLAN", with a vertical or horizontal axle with an application range of between 2 and 20 meters for the waterfall height.

Finally, we mention the so-called double impulse or cross-flow turbines whose application range varies between 2 and 200 meters of waterfall height.

From the present hydraulic machines mentioned, it is clear that no hydraulic machine exists for waterfall heights of less than 2 meters that offers a normally acceptable performance and which would make use of any of these machines economical.

The Applicant's own Invention Patent number 8703324 should be mentioned, which refers to a hydraulic machine consisting of an impeller housed in an open cylindrical chamber, formed by a right prism that has a minimum weight/volume ratio and whose right section is an equilateral triangle with curved sides.

However, with this present invention, the object obtained is a perfected hydraulic machine which amply surpasses Patent 8703324, thus obtaining a much higher yield, in addition to having achieved a more simple impeller design, as this invention is based on straight planes while in Patent 8703324 this had to be carried out by means of curved profiles which were difficult to produce and any variation in the profile's shape greatly influenced the machine's final yield.

SUMMARY OF THE INVENTION

The invention is a hydraulic machine comprising a first body, or impeller formed by a right prism whose weight/volume ratio is minimum and it forms an irregular hexagonal section with three sides being larger than the other three and this hexagon's vertexes form a sole circumference. The hydraulic machine's second body consists of an open cylindrical chamber, concentric to the impeller and covering an angle of approximately 83 degrees, which is clearly less than to the 120 degrees required in Invention Patent 8703324.

The impeller's vertexes are in charge of closing the chamber, and the impeller's edges-when passing the closure section during its cycle divides the machine's upward water section and downward water section; thus achieving that the pressures originating in the areas—and which are of different intensities—depending on the level of water reached in each one, act efficiently on the impeller's submerged surfaces.

Based on its form of operation, this machine could be classified as a positive displacement volumetric machine because with each revolution the impeller displaces a constant volume of water from the upper water area to the lower water area. Thanks to these characteristics and knowing the machine's revolutions per minute and the available waterfall capacity, the impeller's length can be adjusted to adapt itself to this condition.

DETAILED DESCRIPTION OF THE INVENTION

Figure 1:
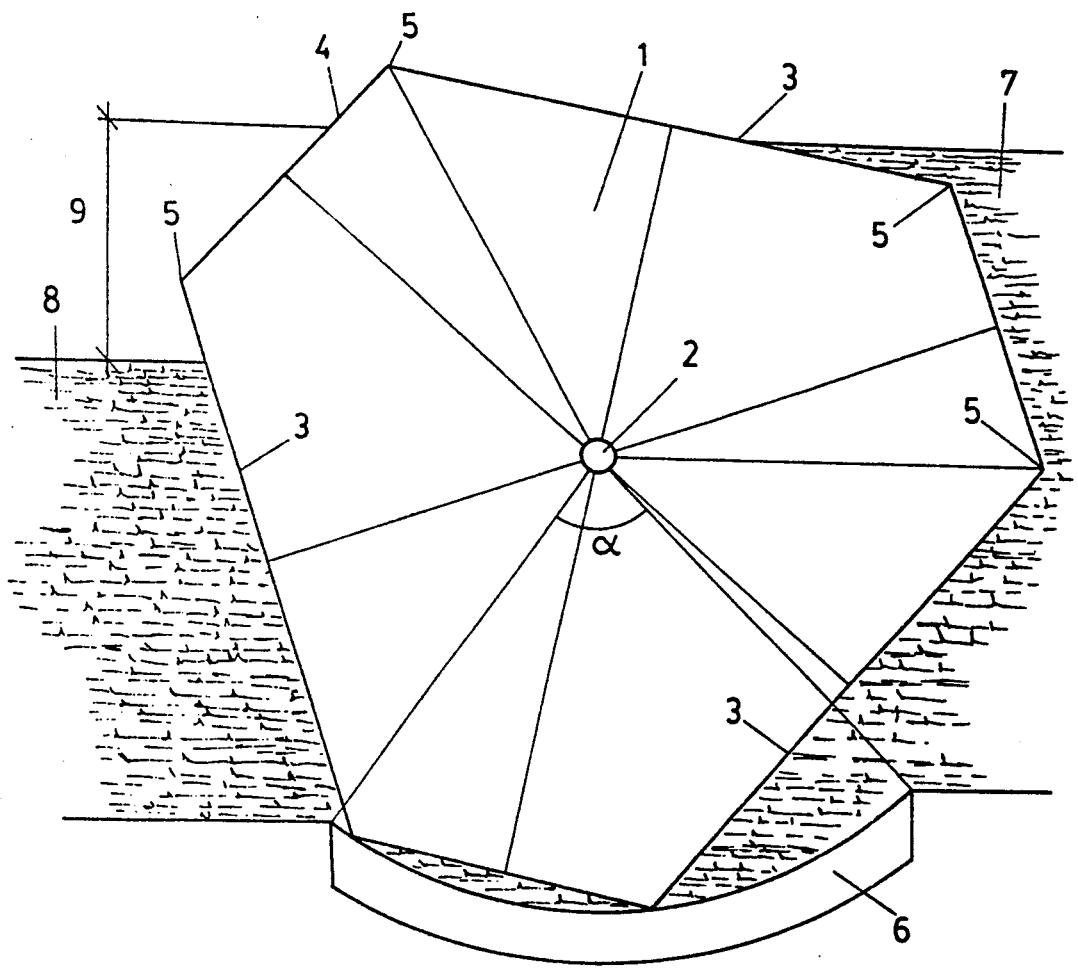
FIG. 1 depicts a sectional drawing of a hydraulic machine constructed in accordance with the teachings of the present invention.

In order to give a detailed description of the invention, we refer to the attached drawing, which has been represented in the preferred manner of realization, as an example but without any limitations whatsoever.

FIG. 1, which is the only drawing, represents a sectional drawing of the inventive hydraulic machine, showing the impeller's right section -1- consisting of a minimum-density right prism, transversally semi-submerged in the water flow's stream with its axle -2- being parallel to the waterfall plane. This prism's right section is an irregular hexagon that has two unequal sides, a larger side -3- and the other side -4-alternating, with each and every one of the vertexes -5- of said hexagon belonging to a single circumference whose center is axle -2-.

This impeller -1- is placed inside a cylindrical chamber -6-concentric to the impeller, thus obtaining contact between the impeller -1- and the chamber or by means of the impeller's vertexes -5- or in other words by the edges of the impeller's prismatic body.

This cylindrical chamber -6- covers an inside angle of approximately 83 degrees, coinciding with the angle covered by any one of the three larger sides, whose exact angle is 82° 31' 57.65 degrees thus obtaining a regular operation while the angle covered inside the smaller sides is 37° 28' 2.65" degrees.

The magnitude of the hexagon's larger sides is 1.31912 times the circumference's radius, where it is inscribed, while the smaller side has a value of 0.642338 times the circumference's radius where the hexagon is inscribed.

The inventive hydraulic machine is completed with a body or housing where the impeller is housed, which is not represented in this figure, as it is not necessary to explain the invention.

The density of the impeller -1- should be as low as possible, as one of the forces that will act on same-and which will have a definite influence on the impeller's movement-will be the upward force imposed on same. Due to the volume displaced by Archimedes' principle, this force will be equal to the volume of displaced liquid. Therefore, the lower the impeller's density, the greater this force's influence will be on its final yield.

On each side of the impeller we have the two water masses -7-and -8- with -9- being the difference in level between both masses and which constitutes the waterfall being used in the installation.

The main advantage of this turbine, as it is described, is its total adaptability to any waterfall condition, such as flow, height, etc. and it requires a minimum infrastructure for its installation.

By using this turbine, a suitable performance is obtained for water flows which have not been used up to now due to this technique's being uneconomical and because no devices existed for using this energy with a minimum acceptable performance. This machines can be used for continental water sources as well as for taking advantage of sea water and only certain technical changes are required merely to adapt the machine to the desired application.

Due to its construction, the yields are maintained when the water flow direction is inverted, therefore its operation is directly reversible.

We claim:

1. A hydraulic machine for operating in cooperation with a minimum height waterfall comprising:
    a hexagonal shape impeller having six sides, three of said sides being equal in length and longer than the remaining three of said sides, said remaining three sides being equal in length so as to define three short sides and three long sides, wherein said long sides alternate with said short sides to define the hexagonal shape of said impeller, and having six vertexes, each vertex being formed where a corresponding one of said long sides intersects a corresponding one of said short sides equidistant from an axis of rotation of said impeller; and
    axle means attached to said impeller at said axis of rotation for enabling said impeller to rotate about said axis in response to said minimum height waterfall.

2. The hydraulic machine of claim 1 further comprises:
    a housing having an inner cylindrical surface concentric to said axis of rotation and having a radius substantially equal to the distance of each said vertex of said impeller from said axis of rotation; and
    wherein said inner surface is approximately 83 degrees in arc length and is proximate to each said vertex of said impeller to form a seal between each said vertex and said inner surface.

3. The hydraulic machine of claim 1 wherein each one of said long sides and said distance to each said vertex define a central angle of 82 degrees, 31 minutes and 57.65 seconds and each one of said short sides and said distance to each said vertex define a central angle of 37 degrees, 28 minutes and 2.35 seconds.

4. The hydraulic machine of claim 2 wherein each one of said long sides and said distance to each said vertex define a central angle of 82 degrees, 31 minutes and 57.65 seconds and each one of said short sides and said distance to each said vertex define a central angle of 37 degrees, 28 minutes and 2.35 seconds.

5. The hydraulic machine of claim 1 wherein each one of said long sides has a length equal to 1.31912 times said distance from said axis of rotation to each said vertex and each one of said short sides has a length equal to 0.642338 times said distance from said axis of rotation to each said vertex.

6. The hydraulic machine of claim 2 wherein each one of said long sides has a length equal to 1.31912 times said distance from said axis of rotation to each said vertex and each one of said short sides has a length equal to 0.642338 times said distance from said axis of rotation to each said vertex.

7. The hydraulic machine of claim 3 wherein each one of said long sides has a length equal to 1.31912 times said distance from said axis of rotation to each said vertex and each one of said short sides has a length equal to 0.642338 times said distance from said axis of rotation to each said vertex.

8. The hydraulic machine of claim 4 wherein each one of said long sides has a length equal to 1.31912 times said distance from said axis of rotation to each said vertex and each one of said short sides has a length equal to 0.642338 times said distance from said axis of rotation to each said vertex.

9. The hydraulic machine of claim 1 wherein said hexagonal shape impeller is rotatable about said axis of rotation in two directions and generates an identical yield from rotation in either direction.

10. The hydraulic machine of claim 2 wherein said hexagonal shape impeller is rotatable about said axis of rotation in two directions and generates an identical yield from rotation in either direction.

11. The hydraulic machine of claim 3 wherein said hexagonal shape impeller is rotatable about said axis of rotation in two directions and generates an identical yield from rotation in either direction.

12. The hydraulic machine of claim 4 wherein said hexagonal shape impeller is rotatable about said axis of rotation in two directions and generates an identical yield from rotation in either direction.

13. The hydraulic machine of claim 5 wherein said hexagonal shape impeller is rotatable about said axis of rotation in two directions and generates an identical yield from rotation in either direction.

14. The hydraulic machine of claim 6 wherein said hexagonal shape impeller is rotatable about said axis of rotation in two directions and generates an identical yield from rotation in either direction.

15. The hydraulic machine of claim 7 wherein said hexagonal shape impeller is rotatable about said axis of rotation in two directions and generates an identical yield from rotation in either direction.

16. The hydraulic machine of claim 8 wherein said hexagonal shape impeller is rotatable about said axis of rotation in two directions and generates an identical yield from rotation in either direction.

* * * * *